United States Patent [19]

Haff, Jr.

[11] Patent Number: 5,083,262

[45] Date of Patent: Jan. 21, 1992

[54] LANGUAGE BINDINGS FOR GRAPHICS FUNCTIONS TO ENABLE ONE APPLICATION PROGRAM TO BE USED IN DIFFERENT PROCESSING ENVIRONMENTS

[75] Inventor: Lyle E. Haff, Jr., Owego, N.Y.

[73] Assignee: International Business Machines Corporation, Armonk, N.Y.

[21] Appl. No.: 590,327

[22] Filed: Sep. 27, 1990

Related U.S. Application Data

[63] Continuation of Ser. No. 856,710, Apr. 28, 1986, abandoned.

[51] Int. Cl.⁵ .............. G06F 9/45; G06F 15/60; G06F 9/44
[52] U.S. Cl. .................. 395/500; 364/239.9; 364/927.92; 364/977.1; 364/978; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,558,811 | 1/1971 | Montevecchio et al. | 364/900 |
| 3,653,001 | 3/1972 | Ninke | 364/200 |
| 3,830,962 | 8/1974 | Mailloux | 364/900 |
| 3,893,075 | 7/1975 | Orban et al. | 364/900 |
| 4,094,000 | 6/1978 | Brudevold | 364/900 |
| 4,177,514 | 12/1979 | Rupp | 364/200 |
| 4,414,621 | 11/1983 | Bown et al. | 364/200 |
| 4,525,804 | 6/1985 | Mosier et al. | 364/900 |
| 4,529,978 | 7/1985 | Rupp | 340/727 |
| 4,539,653 | 9/1985 | Bartlett et al. | 364/900 |
| 4,623,963 | 11/1986 | Phillips | 364/300 |
| 4,646,228 | 2/1987 | Ikeda | 364/192 |
| 4,649,479 | 3/1987 | Advani et al. | 364/300 |
| 4,694,396 | 9/1987 | Weisshaar et al. | 364/300 |

OTHER PUBLICATIONS

IBM Publication entitled "Graphics Development Toolkit", (Aug. 1984), pp. iii-xiii, 1-1 to 1-33.
IBM Publication entitled "IBM Personal Computer Graphical File System", (Nov. 1984), pp. iii-xxv.
IBM Publication entitled "IBM Virtual Machine/Personal Computer User's Guide", (Dec. 1984), pp. iii-xiii.
"GSS-Drivers Assembler Binding Programmer's Guide", Graphic Software Systems, Inc. (Oct. 1984), pp. iii-ix, 1-1 to 1-10.
IBM Publication GA37-0014-0 entitled "IBM VM/PC Toolkit-VDI Graphics User's Guide", published Aug. 1985.

*Primary Examiner*—Thomas C. Lee
*Assistant Examiner*—Ken S. Kim
*Attorney, Agent, or Firm*—Baker, Maxham, Jester & Meador

[57] ABSTRACT

Establishing a language specific linkage between high-level graphics application programs written in a specific programming language and different intermediate-level graphics processors permit a graphics application program to be transported between and used in different graphics processing systems. A single, portable graphics application program can be used with any of the graphics processors with which an application language linkage has been established to produce graphs on an output device.

14 Claims, 4 Drawing Sheets

LANGUAGE BINDINGS FOR GRAPHICS FUNCTIONS TO ENABLE ONE APPLICATION PROGRAM TO BE USED IN DIFFERENT PROCESSING ENVIRONMENTS

This is a continuation of application Ser. No. 06/856,710 filed Apr. 28, 1986, now abandoned.

BACKGROUND OF THE INVENTION

The invention is in the field of computer graphics, and more particularly concerns the operation of diverse graphics processors in response to a single graphics application program written in a certain programming language, the response of any graphics processor afforded by means of a set of common language linkages that translate the application program functions into sets of commands and data for the processor.

As is known in the art, a graphics processor is a software construct embracing a set of callable subroutines, functions, or commands that provides an interface between graphics application programs written in device-independent languages and a graphics output device that produces graphs defined by the application programs. The graphics processor constitutes an intermediary between an application program written in a high-level, user-comprehendible programming language and device-dependent graphics device processors, which respond to sets of low-level instructions. The volume by J. Foley and A. Van Dam, entitled "Fundamentals Of Interactive Computer Graphics," Addison-Wesley, 1982, 1984 is instructive in the characteristics and operations of graphics processors.

In the past, the structure and operation of a graphics processor have had to take into account the characteristics of the software and hardware context within which the processor operates. Thus, a representative graphics processor is the graphics data display manager (GDDM) processing subsystem designed for operation in the main frame computer environment exemplified by the System 370 computing system available from IBM. The GDDM provides a graphics-output-device-independent interface to an application programmer, receives application language function or subroutine calls which set processor operational conditions and activate processor graphical primitive commands, and operates an output device driver, which produces graph representations corresponding to the called commands and having attributes determined by the set conditions.

Another graphics processor is represented by the proposed Computer Graphics Interface (CGI) Standard X3.122 promulgated by ANSI. The Computer Graphics Interface defines the characteristics of a graphics processor which stands between output device-specific drivers and output device-independent application processes in a graphics environment. For application programs, the CGI processor performs receiving and operating functions that correspond to those of the GDDM. However, the CGI assumes a basic set of graphics primitives such as shapes, lines, and text characters, and associates with each set of primitives a respective set of primitive attributes such as color, line thickness, and character type. The CGI receives the application program graphics command and attribute information in the form of one or more standard data objects called "metafiles." A metafile is a device-independent description of a graph or graph portion in terms of graphical primitive elements such as lines or text and primitive attributes such as line color and text style. The metafiles received by the processor cause it to operate a specified output device driver. An IBM product, the personal computer AT/370, has available a graphics processor referred to as the Virtual Device Interface (VDI), which embodies the CGI Standard.

It will be evident to those skilled in the art that the subroutines employed by a GDDM-type processor to transform application program statements to graphical primitive commands and attributes differ from those of a CGI processor. Other differences between the processors can exist. For example, although both the GDDM and the VDI embodiments employ point coordinates in line drawing and object positioning, the processors use different structures to organize the data points: the GDDM point array is organized as $(x_1, x_2, \ldots, x_n)$, $(y_1, y_2, \ldots, y_n)$, while the VDI structures its points in the form $(x_1,y_1), \ldots, (x_n,y_n)$. Further distinctions include: different character codes; different color representation and indexing; and different forms of representation for graphical primitive attributes.

From the standpoint of programmer efficiency, it would be desirable to enable different graphics processors to respond uniformly to a single high-level graphics application language program. This would permit an application programmer to create a graphics program using a single set of statements, which would result in the creation of identical graphs using any one of a number of different graphics processing facilities. This property is commonly called portability. However, to date, application programmers must construct graphics programs that are tailored to the specific characteristics of the graphics processing service embodied in the computing facility available to the programmer. Thus, even when the programmer employs the same graphics application language to operate different graphic processing services, the programmer must construct an application program tailored to the specific graphics processor. In this regard, then, graphics application programs are not portable between different processing facilities, even if expressed in the same language.

Therefore, there is an evident need for a construct that will provide a mode of establishing linkages to any of a variety of different graphics processors from a single graphics application program rendered in a particular programming language.

SUMMARY OF THE INVENTION

The primary objective of this invention is, then, to provide such linkages in the form of common language bindings that will permit a single graphics application program, written in a particular programming language, to operate any one of a plurality of respectively-constructed graphics processors.

The invention is expressed as a process construct for providing a language binding linking a graphics application interface and a graphics processor. The construct provides for: translating application language graphics specification data into graphics process-specific commands and attributes; building command and attribute data transfer structures for translated graphics process-specific commands and attributes; and establishing a command and attribute data transfer path for providing the built data structures from the graphics application interface to the graphics processor.

The process construct is embodied in a representative graphics application programming language context.

DETAILED DESCRIPTION OF THE PREFERRED EMBODIMENT

Figure 1:
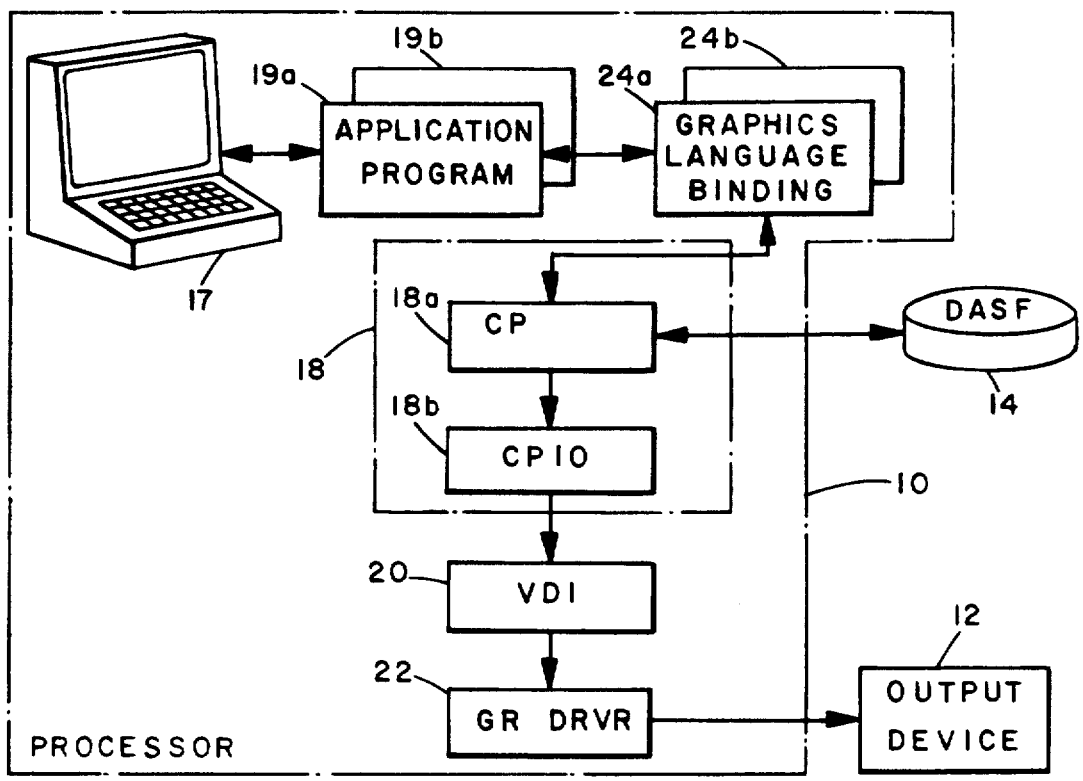
FIG. 1 is an illustration of a desk top computer-based graphics processing system in which one embodiment of the invention is used.

Refer now to FIG. 1 for an understanding of a desk top personal computer-based graphics processing system. The system consists of a desk top processor such as the well-known Personal Computer AT/370 available from IBM. One or more graphics output devices such as the device 12 can be driven by the processor 10. The desk-top graphics processing hardware complement is completed by a direct access storage facility (DASF) 14, such as a disk drive which is attached to the processor 10 for extended storage.

Conventionally, the processor 10 is embodied in a desk-top processor module 17 which includes a keyboard through which user-originated application input parameters can be entered into the graphics processing system. The console 17 also includes a CRT display providing a user/system interaction interface.

The primary software structures necessary to enable the processor 10 to perform graphics processing and computation are an operating system (OS) 18 and one or more application programs 19a and 19b. It is understood that the programs 19a and 19b are written in respective graphics application programming languages such as, for example, FORTRAN and PASCAL. As is conventional, the operating system 18 includes a control program (CP) 18a which supervises the execution of the application programs by managing and scheduling access to the processor resources necessary to support program execution. A control program I/O module (CPIO) 18b orchestrates the interface between the processor 10 and external devices such as the device 12. Each of the application programs 19a and 19b is a series of statements constructed by a user that form a program for a particular application to be executed using the resources of the processor 10. In this case, the application programs 19a and 19b consist of graphics programs written by a user to create graphs or charts on output devices such as the plotter 12. Completing the graphics processing system of FIG. 1 are a graphics processor 20, which can comprise, for example, the VDI processor described above. A graphics device driver (GR DRVR) 22 is connected to a specific output device, in this case, the device 12.

In operation, the operating system 18 can receive data and commands directly from one of the application programs 19a or 19b and provide resource allocation and program connectivity directly to the graphics processor 20. As is known, the commands and data provided to the graphics processor 20 are characteristically graphical primitives and attributes in the form of metafiles. As is known in the art, graphical primitives are data structures that correspond to basic graphic figures such as lines or shapes. Attributes are data structures that define the characteristics of the graphical primitives. In this regard, attributes include qualities such as color, texture, and dimension.

The VDI processor 20 provides graphical primitives and attributes to the graphic device driver. The device driver 22 responds to the primitives and attributes by converting them into instructions drawn from a set specific to the device 12.

In order to make the application programs 19a and 19b portable from another graphics processing system incorporating a graphics processor different than the processor 20, graphics language bindings 24a and 24b are provided between the application programs 19a and 19b, respectively, and the operating system 18. In this regard each of the language bindings 24a and 24b consists of a respective set of subroutines that provide language-specific linkages between graphics application programs written in the specific language and the graphics processor 20. When used herein, the term "language-specific" means that a language binding is intended to operate with an application program written in a specific language. For example, a FORTRAN-specific language binding would operate in conjunction with application programs written in FORTRAN.

The language bindings 24a and 24b are maintained in the DASF 14 and obtained by the operating system 18 by conventional storage access means in response to a request entered by a user through the keyboard of the console 17. Throughout the execution of application programs to which the language binding is specific, the binding will reside in the main storage of the processor 10 together with the operating system 18.

Figure 2:
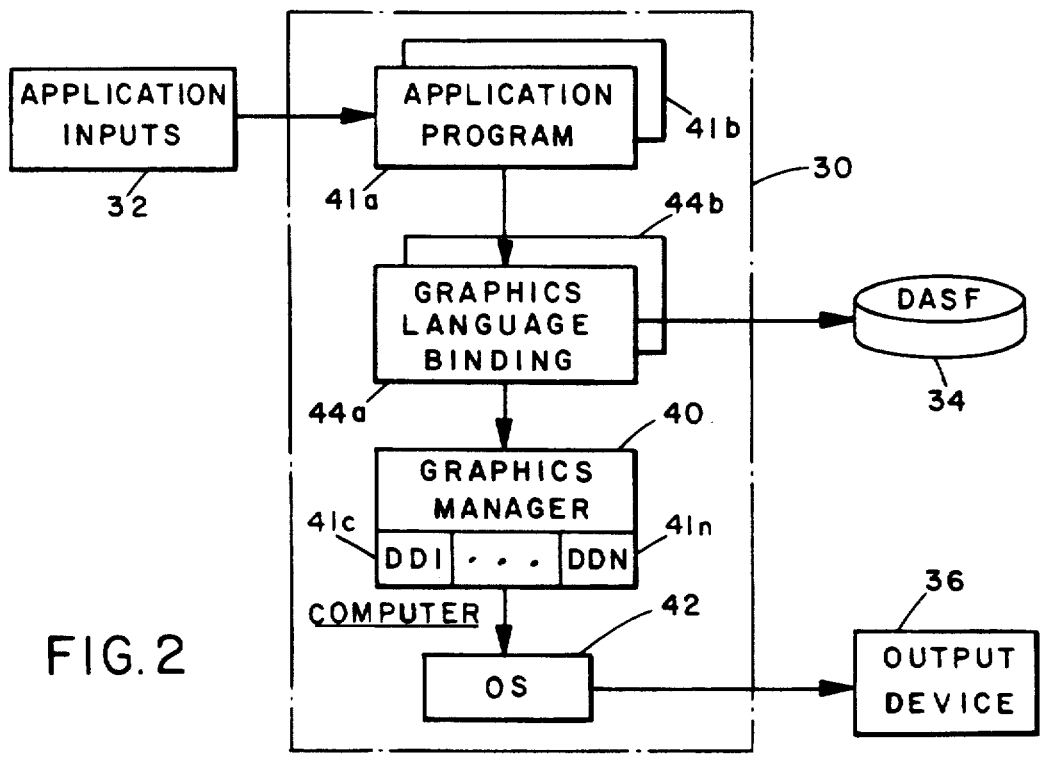
FIG. 2 is an illustration of a mainframe computer-based graphics processing system in which a second embodiment of the invention is used.

In FIG. 2 there is illustrated another graphics processing system incorporating a mainframe computer 30, which can comprise, for example, the IBM product available under the name System/370. As is typical, the mainframe computer 30 has attached to it application input devices 32, which can comprise, for example, workstations which utilize the resources of the computer 30 in a time-shared mode to conduct concurrent application program execution. The computer 30 also has access to a direct access storage facility (DASF) 34 and provides graphical output data in the form of device instructions to one or more graphic output devices such as the device 36.

The internal processing structure of the mainframe computer 30 is conventional and includes a graphics processor in the form of a graphics manager 40 (for example, the GDDM processor described above), which operates to execute graphics application programs such as the programs 41a and 41b to produce graphs and charts on output devices such as the output device 36. The structure of the GDDM is such that it operates a plurality of device-specific device drivers (DD1-DDN) 41a-41n. The graphics manager 40 characteristically translates high-level language expressions of graphs embodied in application programs into command and attribute signals directed to a device driver specified by the application program. The device driver translates the commands and attributes into instructions for the specific device it controls, with an operating system 42 implementing an I/O path between the selected device driver and the specific device it drives.

Commands and parameters of specific application programs can be provided directly to the graphics manager 40 to enable it to perform its command and attribute conversion and device driver selection. However, since the structural and operational characteristics of the graphics manager 40 differ from corresponding characteristics of the VDI graphics processor 20, the application programs 41a and 41b, if provided directly to the manager 40, must be written to call the subroutines specific to the graphics manager 40. The application program interface differences between the graphics processors 20 and 40 mean that an application program written, for example, to produce a specific chart embodiment on the output device 36 through the facilities of the graphics processing system of FIG. 2 cannot be transported unaltered to the graphics processing system of FIG. 1 and result in precisely the same chart being produced on a similar device such as the output device 12.

To provide portability from the graphics processing system of FIG. 1 to that of FIG. 2, graphics language bindings 44a and 44b are also provided in the graphics processing system of FIG. 2. As with the bindings 24a and 24b, the mainframe system graphics language bindings 44a and 44b are functionally positioned between the application programs 41a and 41b, on the one hand, and the graphics manager 40, on the other hand.

Figure 3:
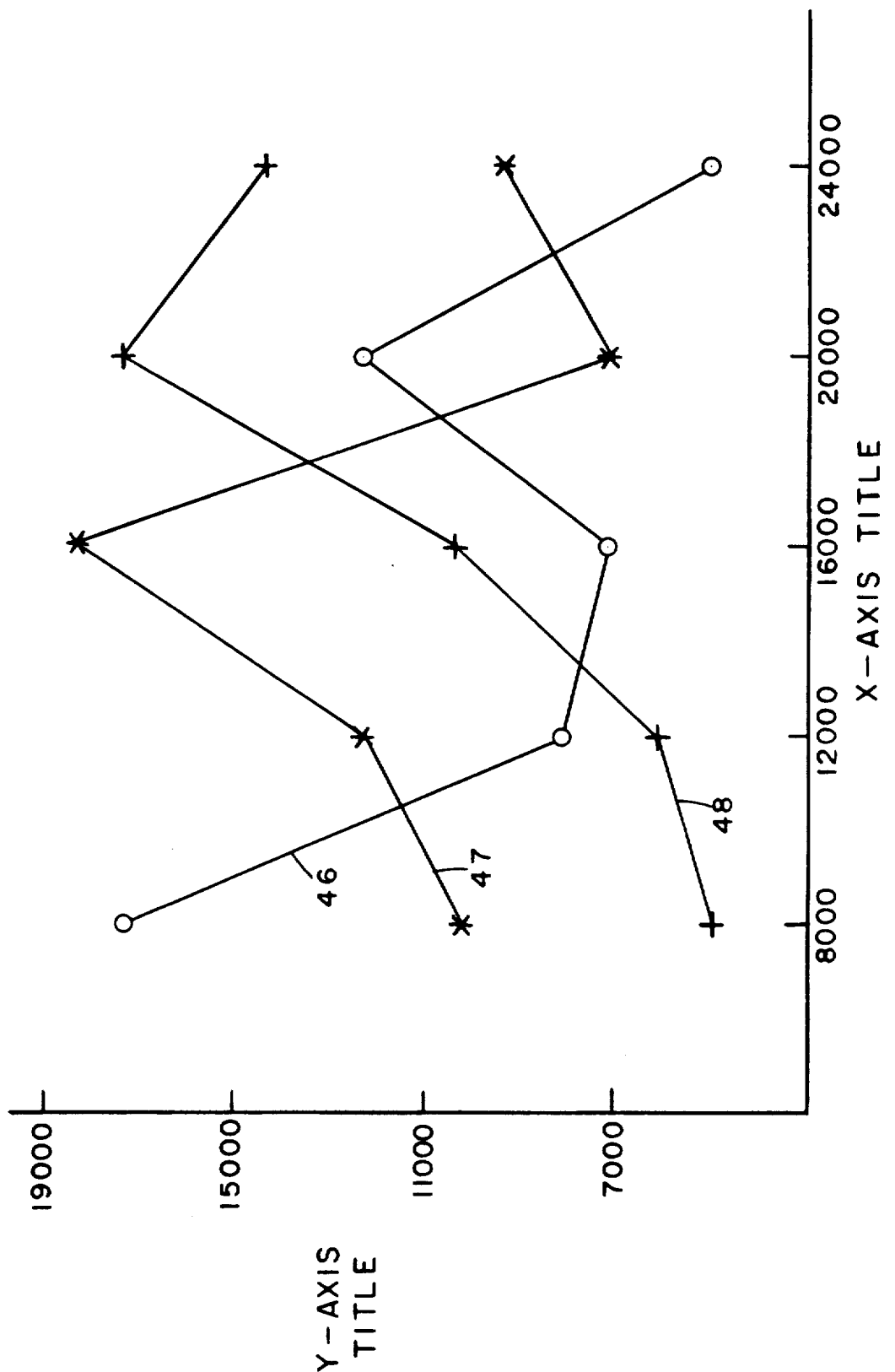
FIG. 3 illustrates a chart to be drawn by the systems of FIGS. 1 and 2 utilizing the invention.

The effect of the language bindings in the systems of FIG. 1 and the system of FIG. 2 can be understood with reference to a chart, illustrated in FIG. 3, which forms the exemplary basis for understanding the invention. The graph of FIG. 3 has x and y axes, with axis labels, graduation marks, and graduation labels; the graph has a title, and three line plots, 46, 47, and 48, each distinguished by having a respective color (although not evident on FIG. 3) and a respective point mark where the graph changes slope. When language linkings are installed in the systems of FIGS. 1 and 2, a single program, written in a particular graphics programming language, will be able to cause the production of the FIG. 3 graph by either, or both of the systems on similar output devices.

Referring now to Table I, a series of Fortran-type statements are representative of a graphics application program to draw the chart of FIG. 3. The statements used in Table I will be understood by those skilled in the art as being typical FORTRAN statements for establishing data objects and data attributes and for performing functions by calls to specific subroutines. In this latter regard, the well-known RC (return code) statement treats a called subroutine as a function that returns the function parameters specified in the parentheses to the right of the subroutine designation.

TABLE I

| | | |
|---|---|---|
| 200 | | IMPLICIT INTEGER#4 (A-Z) |
| 201 | | INTEGER#4 DVC,DVCCHS(66),DVCINT(11) |
| 202 | | CHARACTER#8 DVCNAM |
| 203 | | DATA DVC /Z01F/ |
| 204 | | DATA DVCNAM /'DISPLAY'/ |
| 205 | | DATA DVCINT /1,1,1,1,1,1,1,1,0,1,0/ |
| 206 | | INTEGER#4 LINES(3,10),LINCOL(3) |
| 207 | | DATA LINES /8000,17000, 12000,8000, 16000,7000, 20000,12000, 24000,5000 8000,5000, 12000,6000, 16000,10000, 20000,17000, 24000,14000, 8000,10000, 12000,12000, 16000,18000, 20000,7000, 24000,9000/ |
| 208 | | DATA LINCOL /2,3,5/ |
| 209 | | INTEGER#4 AXES(6),XMARKS(4,5),YMARKS(4,4) |
| 210 | | INTEGER#4 XLBLS(2,5),YLBLS(2,4),XTITLE(2),YTITLE(2) |
| 211 | | INTEGER#4 CTITLE(2) |
| 212 | | DATA AXES /4000,21000, 4000,3000, 30000,3000/ |
| 213 | | DATA XMARKS /8000,3000, 8000,3300, 12000,3000, 12000,3300, 16000,3000, 16000,3300, 20000,3000, 20000,3300, 24000,3000, 24000,3300/ |
| 214 | | DATA YMARKS /4000,7000, 4300,7000, 4000,11000, 4300,11000, 4000,15000, 4300,15000, 4000,19000, 4300,19000/ |
| 215 | | DATA XLBLS /8000,2700, 12000,2700, 16000,2700, 20000,2700, 24000,2700/ |
| 216 | | DATA YLBLS /3700,7000, 3700,11000, 3700,15000, 3700,19000/ |
| 217 | | DATA XTITLE /16000,1800/ |
| 218 | | DATA YTITLE /1400,13000/ |
| 219 | | DATA CTITLE /16384,21000/ |
| 220 | | RC = VOPNWK(DVC,DVCNAM,DVCINT,DVCCHS) |
| 221 | | CHRHGT = DVCCHS(61)*4 |
| 222 | | RC = VSLCOL(DVC,1) |
| 223 | | RC = VPLINE(DVC,3,AXES) |
| 224 | | DO 10, i = 1,4 |
| 225 | 10 | RC = VPLINE(DVC,2,YMARKS(1,I)) |
| 226 | | RC = VSTCOL(DVC,1) |
| 227 | | RC = VSTFNT(DVC,1) |
| 228 | | RC = VSTALN(DVC,2,1,HALGN,VALGN) |
| 229 | | RC = VGTEXT(DVC,YLBLS(1,1),YLBLS(2,1),'7000') |
| 230 | | RC = VGTEXT(DVC,YLBLS(1,2),YLBLS(2,2),'11000') |
| 231 | | RC = VGTEXT(DVC,YLBLS(1,3),YLBLS(2,3),'15000') |
| 232 | | RC = VGTEXT(DVC,YLBLS(1,4),YLBLS(2,4),'19000') |

TABLE I-continued

```
233        DO 20, 1 = 1,5
234    20  RC = VPLINE(DVC,2,YMARKS(1,I))
235        RC = VSTALN(DVC,1,2,HALGN,VALGN)
236        RC = VGTEXT(DVC,XLBLS(1,1),XLBLS(2,1),'8000')
237        RC = VGTEXT(DVC,XLBLS(1,2),XLBLS(2,2),'12000')
238        RC = VGTEXT(DVC,XLBLS(1,3),XLBLS(2,3),'16000')
239        RC = VGTEXT(DVC,XLBLS(1,4),XLBLS(2,4),'20000')
240        RC = VGTEXT(DVC,XLBLS(1,5),XLBLS(2,5),'24000')
241        RC = VSTCOL(DVC,5)
242        RC = VSTFNT(DVC,7)
243        RC = VSTHGT(DVC,2*CHRHGT,CHRWID,CELWID,CELHGT)
244        RC = VSTALN(DVC,1,2,HALGN,VALGN)
245        RC = VGTEXT(DVC,XTITLE(1),XTITLE(2),'X-axis title')
246        RC = VSTALN(DVC,1,0,HALGN,VALGN)
247        RC = VSTROT(DVC,900)
248        RC = VGTEXT(DVC,YTITLE(1),YTITLE(2),'Y-axis title')
249        RC = VSTROT(DVC,0)
250        RC = VSTCOL(DVC,6)
251        RC = VSTFNT(DVC,15)
252        RC = VSTHGT(DVC,4*CHRHGT,CHRWID,CELWID,CELHGT)
253        RC = VSTALN(DVC,1,0,HALGN,VALGN)
254        RC = VGTEXT(DVC,CTITLE(1),CTITLE(2),'Chart Title')
255        RC = VSMHGT(DVC,2*CHRHGT)
256        DO 30, I = 1,3
257           RC = VSLCOL(DVC,LINCOL(I))     258    RC
VSMCOL (DVC,LINCOL(I))
259           RC = VSMTYP(DVC,I)
260           RC = VPLINE(DVC,4,LINES(1,I))
261    30     RC = VPMARK(DVC,4,LINES(1,I))
262        RC = VRQCHC(DVC,1,CHC)
263        RC = VCLSWK(DVC)
264        END
```

Table I draws the chart of FIG. 3 by first telling the FORTRAN compiler to assume all undeclared variables are 4-byte integers (statement 200). Statements 201-204 define the output device upon which the FIG. 3 chart is to be produced as a variable (DVC) and specify the device as a display. Thus, the chart of FIG. 3 is to be produced on a CRT display having an address 01F (hexadecimal). The data declaration statement 205 establishes default values for the following attributes of the graphical primitives to be used in drawing the FIG. 3 graph: device aspect ratio, line type, line color, line mark type, line mark color, text font, text color, and fill style, type, and color, in the order of the 10 right-hand entries of the statement's data field. Statement 207 specifies the x,y coordinate pairs of the lines to be drawn on the FIG. 3 chart, while statement 208 establishes the respective color of each line. Chart labeling information for the x and y axes, for the x and y axis graduation marks, for the axis graduation labels, for the axis titles, and for the chart title are specified in statements 209-219. Statement 220 opens the workstation on which the application program is to be run; the output device is identified as a display device, and the characteristic values are returned in the variable DVCCHS. A minimum height for graphics characters is saved in statement 221. Statement 222 sets the line color (VSLCOL) for the x and y axes, while statement 223 calls a polyline subroutine (PLINE) which draws the x and y axes. Y axis label marks are drawn by statements 224 and 225. The alphanumeric characters comprising the graduation labels and axis title for the y axis extend from statements 226 through 232. In these statements, routines for setting specific text attributes of color, form, and alignment are denoted as VSTCOL, VSTFNT, and VSTALN, respectively. Once the text attributes have been set, the y axis labels are drawn by statements 229-232. In each of these statements the text drawing subroutine has the mnemonic VGTEXT.

The subroutines for drawing x axis labels and label characters comprise statements 233-240.

The text attributes for x and y axis titles (color, form, and height) result from statements 241-243. The x axis title is aligned in statement 244 and drawn in statement 245. Y axis title alignment is given in statement 246, while the text is rotated from the x axis dimension by 90 degrees by statement 247. The y axis title is written by statement 248. The character rotation is restored to the horizontal by statement 249. Chart title attributes result from statements 250-253. The chart title is written by statement 254. The point marker size for the points of the graph lines is set via statement 255. Statements 256-261 draw the three lines of FIG. 3, each with a respective color, which is carried over into the respective point markers. Thus, the line color and marker color (LCOL and MCOL) are set in statements 257 and 258, respectively, the point marker style is set in statement 259, and the line and mark pattern is drawn by statements 260 and 261.

Closing out the application program for drawing the FIG. 3 chart, statement 262 is a command to the device driver to retain the chart on the display until any data key on a keyboard is pressed. In this regard, it is implicit that the device has processing means for retaining and refreshing a complete representation of the FIG. 3 chart as specified by the program of Table I. Such devices are well known in the art and include some form of a refresh buffer, frame buffer, or bit map. See the Foley and Van Dam reference for a description of a raster-scanned display and associated processor at pages 129-133. Finally, workstation termination is accomplished by statements 263 and 264.

Figure 4:
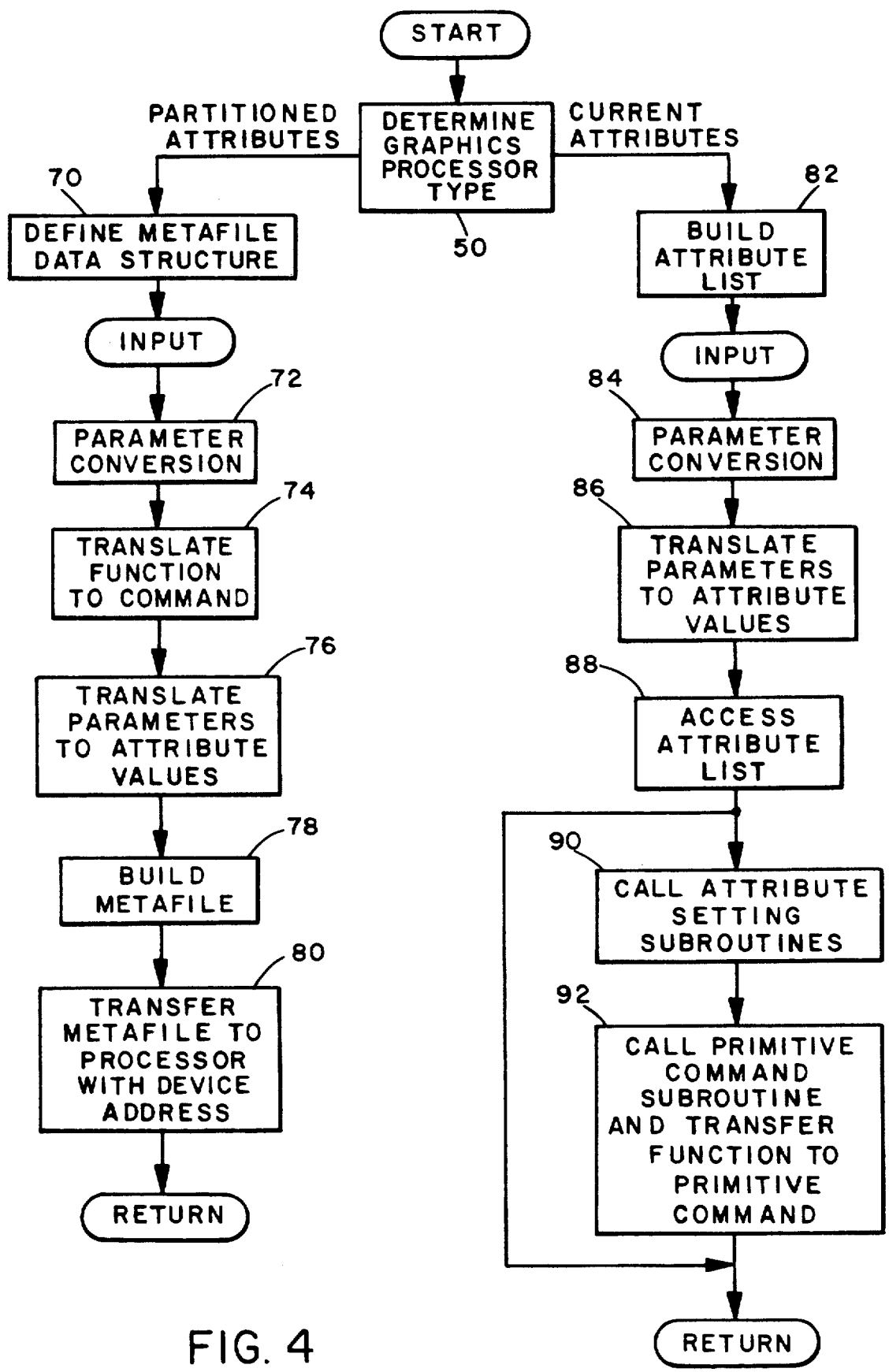
FIG. 4 is a flow diagram illustrating, in one major branch, an embodiment of the invention for use with the system of FIG. 1 and, in the second major branch, another embodiment of the invention for use with the system of FIG. 2.

In order to support portability of the Table I graphics application program between the graphics processing systems of FIGS. 1 and 2, language bindings are provided which take into account the characteristic structure and operation of each of the graphics processors 20 and 40. This accounting is illustrated in FIG. 4, which represents an abstraction of a procedure for selecting a language binding appropriate to the particular graphics processing system as well as the operational steps implemented by each of the language bindings. Thus, the type of graphics processing system is determined in step 50. As described above, the two representative graphics processing systems can be differentiated on the basis of how they define attibutes for graphical primitives making up the representation of a graph. The left-hand exit from step 50 leads to a language binding that assumes a graphics processing system of the CGI type where graphical primitives are partitioned according to a number of basic types and attributes are specified with regard to the graphical primitive type. Thus, for example, a color attribute may be set for graph text primitives independently of the color for graph lines. On the other hand, graphics processors of the GDDM type described above define a current set of attibutes for the type of graphical primitive currently being drawn and maintain those attibutes until they are changed. Thus, if the current color attribute is set at a particular color selection, during the drawing of a selected graphical primitive, for example, a line, the programmer must remember to change the color attibute later in the application program in order to draw, for example, text of a different color. As described above, other differences between the two representative graphics processors include, but are not necessarily limited to, line-drawing coordinate procedures, color specification and listing, and text character specification and designation.

In FIG. 4, it is further assumed that the application programming language is oriented toward a graphics processor employing an attribute partitioning approach, as does the VDI graphics processor. Thus, the FORTRAN statements in Table I reference respective subroutines for setting line color (VSLCOL ), text color (VSTCOL), and graph line marker color (VSMCOL). It should be evident, however, that the inverse assumption could easily be made. That is, the application language could be based on the current attribute approach of the GDDM graphics processor.

Figure 5:
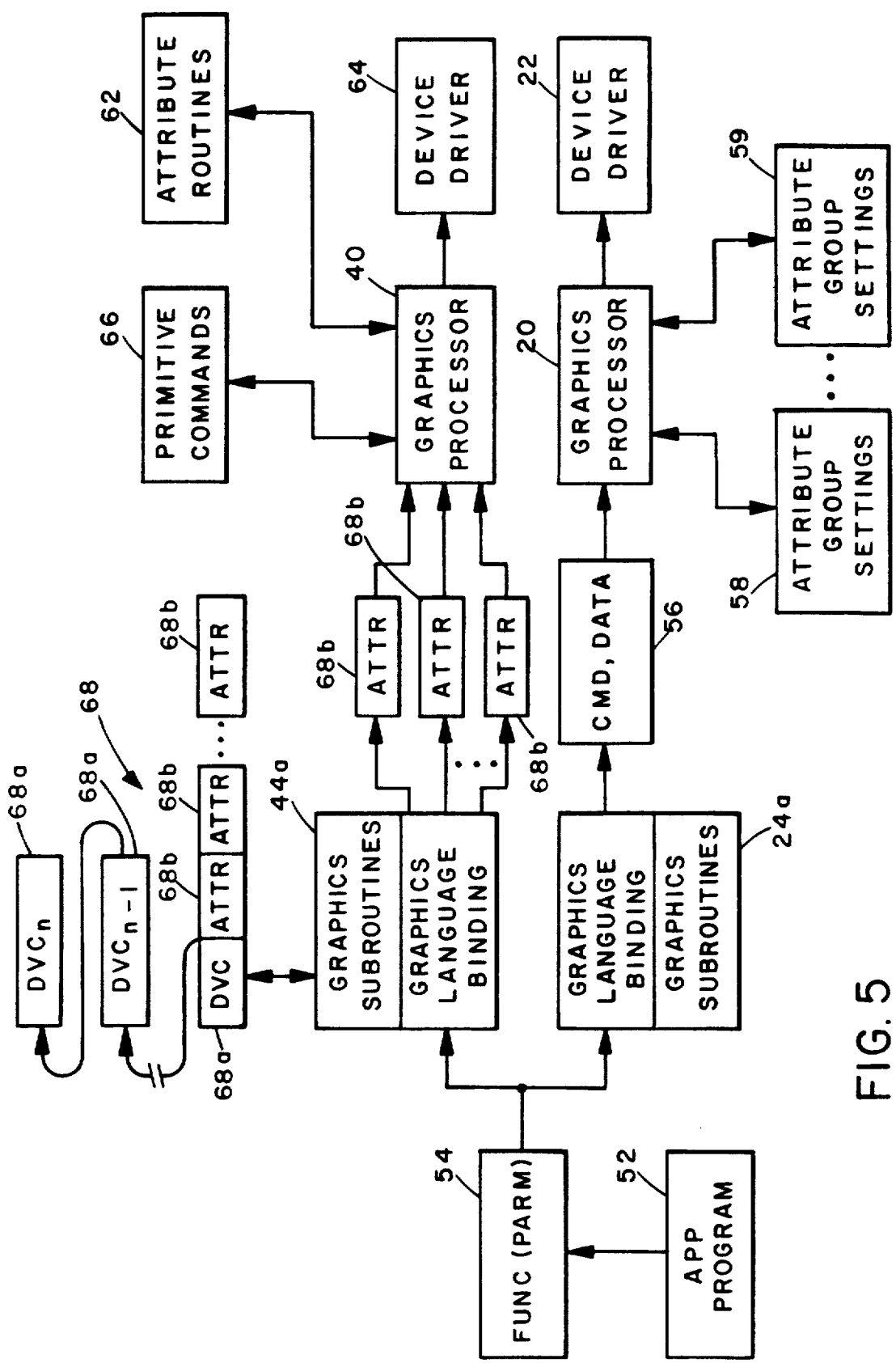
FIG. 5 is an illustration of the data structures and data and command paths characteristic to the two embodiments of the invention.

To further clarify the procedures of FIG. 4, the relationships between the language bindings and the respective graphics processors and related data objects are illustrated in FIG. 5. In FIG. 5, the flow of information begins with an application program 52 written in a particular language, such as FORTRAN. The application program provides the input data 54 to the respective language bindings in the form of function calls and parameter specification (func(parm1 . . . parmn)), as is done in the program of Table I. The inputs are provided to one of the language bindings 40a or 24a.

The graphics language binding 24a provides a language-specific linkage between the graphics function calls of the application program 52 and the CGI-style graphics processor 20. As is stated above, the interface is in the form of a conventional metafile 56 which includes information in the form of a command (CMD) relating to either the drawing of a specific graphics primitive or to the setting of a specific graphics primitive attribute. Specific values for attributes related to the drawing of a primitive or setting of a primitive attribute are contained in a discrete data (DATA) section of the metafile 56. The function of the graphics language binding 24a is to convert the functional and parametric data provided by the application program 52 into the metafile format understood by the graphics processor 20. To perform this conversion, the graphics language binding 24a includes a set of graphics function subroutines. Each function call of the application program 52 activates a specific one of the graphics subroutines to effect the conversion to be performed by the language binding 24a. The metafiles resulting from the conversion are passed to the graphics processor 20; they permit the processor 20 to control the device driver in drawing a graphics primitive, if required by the command portiion of the metafile 56. If the metafile command is simply for attribute setting, the graphics processor 20 will set an attribute specified by the command to the value indicated by the metafile data field. The graphics processor 20 maintains lists of attribute group settings 58 and 59, with each attribute group corresponding to a particular set of graphical primitives. As is known, a CGI-style graphics processor will, in executing a graphics primitive drawing command, cause the device driver 22 to render the primitive with characteristics determined by the values of the attributes associated with the primitive.

The graphics language binding 44a maps precisely the same application program statements as does the language binding 24a. However, the language binding 44a maps the functions and parameters of the application program 52 into a format and according to a sequence understood by the graphics processor 40. In this regard, the graphics language binding 44a also includes a group of graphics function subroutines; each function called by the application program 52 is associated with a respective one of the binding subroutines. The functions and parameters of the application program 52 are translated and provided to the graphics processor 40 in a format that corresponds to a set of discrete, parallel signal interfaces between a pair of electronics equipments. In this regard, each subroutine of the binding 44a will translate the parameters of the calling function statement together with predetermined attribute values into attribute-setting subroutine calls to the processor 40. Each subroutine call can be likened to setting the value of an individual signal line at the input to the graphics processor 40. The attribute subroutine calls cause the graphics processor 40 to access a set of processor attribute routines 62 which set the attribute values for a device driver 64 identified in the function call of the application program 52. Once the graphical primitive attributes have been set, the subroutine of the language binding 44a will call a graphical drawing subroutine to draw the required graphical primitive. The command subroutine call to the graphics processor 40 will cause the processor to access a set of primitive commands 64 from which the proper primitive command is selected for operating the device driver 64. Therefore, the input sequence for the language binding 44a is: first, set current attribute values for the graphics processor 40; and then, activate the proper graphics processor primitive command. It should be noted that the selection of an attribute-partitioning graphics programming language to construct the application program 52 requires the provision of an attribute table, indicated by reference numeral 68, which is maintained by the language binding 44a. Since the attribute-partitioning language assumes the maintenance of attribute groups, rather than teh constant setting and resetting of current attribute values, such a structure must be maintained in order to accurately map attribute values set by the program 52 into current attribute settings for the processor 40. In this regard, the attribute table 68 consists of a conventional linked-list of device identifiers, (DDC-DDCn) 68a each of which anchors an attribute list for the identified device. The attribute list includes a plurality of entries, (ATTR) 68b each corresponding to a respective attribute invoked or set by the application program 52 for the identified device. The values contained in the list elements are the value settings for the corresponding attributes.

Referring now to FIGS. 4 and 5, once the graphics processor type has been determined in procedure block 50, the proper language binding is selected. The left-hand exit from procedure block 50 corresponds to selection of a language binding for the CGI-style graphics processor in which graphical attribute are partitioned according to graphical primitive classifications. The right-hand exit corresponds to the GDDM-style of graphics processor wherein current attribute setting values determine the characteristics of graphics primitives drawn in response to primitive commands.

With respect to the left-hand exit, representative of the procedure followed by the language bindings 24a and 24b, the metafile object needed for exchanging information between the language binding and the graphics processor 20 is abstracted as a data structrue in step 70. Following this, the procedure accepts the return code function calls of the application program 52 and processes them individually in sequence. Each function call includes a return code statement having the form illustrated by reference numeral 54 in FIG. 5. Initially, in step 72, each function call is inspected to determine whether a parameter conversion must be made. For example, if the text characters are specified in the application program 52 as being EBCDIC characters, the characters must be converted to ASCII to satisfy the requirements of the VDI Graphics Processor. If required, the conversion is performed and the function routine passes to step 74. In step 74, the called function is translated to the corresponding metafile command format, following which, in step 76, the parameters are converted to attribute values according to the data format required by the metafile structure. In step 78, the function subroutine builds a specific metafile data structure with the translated command and attribute values. In step 80, the routine dispatches the built metafile to the graphics processor, together with the address of the graphics output device upon which a graph according to the application program 52 is being produced. When the metafile is transferred to the graphics processor 20, the language binding function routine provides a return to the application program 52 with the specified return codes set.

As shown in the right-hand leg of the FIG. 4 procedure, the language binding such as 40a responds to the application program 52 by first building a device attribute list for entry into the attribute table 68 of FIG. 5. The attribute list is indexed by the identification of the output device upon which the graph of the application program is to be produced. Initially, the default values established for the attributes (in statement 205 of Table I, for example) are entered into the attribute list for the identified device. Following the building of and initial entry into the attribute list, the language binding is prepared to accept the sequence of function calls making up the application program 52. As each function call is provided to the language binding, the call parameters are inspected to determine whether parameter conversion must be performed. In this regard, the GDDM-type graphics processor 40 operates in response to real number values, while the CGI-style graphics processor 20 operates on integer-valued numbers. Since the application program 52 favors the CGI form of representation, each parameter must be converted from its integer to its real value in step 84. Next, the attribute value and primitive command structure appropriate to the graphics processor 40 must be established for each function called by the application program. In this regard, the language binding in step 86 translates the parameters received with the function call into attribute values of the form recognized by the graphics processor 40. Next, the attribute list for the identified graphics output device is accessed in step 88. If the current application program statement requires setting an attribute, the attribute value is set in the appropriate place in the attribute list. If the application program statement was used only to set an attribute, as opposed to drawing text or a symbol or line, the procedure will return to the application program with the appropriate return code settings after step 88. On the other hand, if the application program statement requires drawing a portion of a chart, the procedure will enter step 90. In step 90, the language binding calls the necessary attribute-setting subroutines of the graphics processor 40. Each of the attribute-setting subroutines is provided with the value to which the attribute affected by the called subroutine is to be set. Following attribute setting, the language binding, in step 92, will call the primitive command subroutine of the graphics processor 40 that is necessary to draw the required primitive or primitives. If required, the language binding subroutine will translate the function into a series of primitive commands in order to accomplish the required function. For example, if the function call in the application program is appropriate for drawing a set of lines, such as axes, the invoked language binding function routine will call the graphics processor primitive command for line drawing. To draw one or more lines, the language binding must call the primitive command to establish the current point and then call the line-drawing primitive command to draw the line segments. Once the required drawing task is completed, the language binding follows appropriate return procedures and obtains the next function call of the application program.

Referring once again to Table I, each of the language bindings consists of a set of callable functions or subroutines. Each graphics RC statement in Table I invokes a specific function in a language binding which translates the statement, and the attribute parameters in the statement's parameter field into a command and attribute data tailored to the characteristics of a grahics processor. Each binding thus maps the following representative generic functions called in the application program to a specific subroutine; VSLCOL (set line color); VPLINE (draw a polyline); VSTCOL (set text color); VSTFNT (set text font); VSTALN (set text alignment); VGTEXT (write text); VSTHGT (set text height); VSTROT (set text baseline rotation); VSMHGT (set line marker size); VSMCOL (set mark color); VSMTYP (set mark type) and VPMARK (draw polymark). It is to be understood that these are only representative of a great number of generic graphics functions that can be called by an application program and supported by corresponding language binding function routines.

Refer now to Tables II-V which provide specific representations of function routines included in the language binding 24a. The representative function routines are explained in light of specific graphics function calls in the graphics application program of Table I. It is to be noted that the entries in Tables II-V are in a pseudo-code which is not compilable, but which is nonetheless representative of coding functions used to build the language binding, and which is easily translated by those skilled in the art into compilable statements.

It is assumed for the sake of the following illustration that the language binding statements of Tables II-V are directed to the support of graphics functions performed in a desk-top graphics processing system such as would be based upon the AT/370 desk-top computer available from IBM. In this regard, the graphics functions in such a desk top computing system are performed by converting the graphics primitive associated with a function called by the graphics application program of Table I into its corresponding graphics processor metafile command. For the purposes of the VDI graphics processor example (which embodies the CGI Standard), the metafile data structure is represented by the statements 300-303 of Table II.

TABLE II

| 300 | Variables |
|-----|-----------|
| 301 | metafile = structure |
| 302 | command:integer |
| 303 | values:array[1..n] of integer |

Statements 300-303 are well-understood declaration statements which establish the definition of a metafile data structure that contains: a command in integer form, constituting the graphics primitive command corresponding to a graphics primitive function to be performed and an array of integer values corresponding to the graphics primitive data establishing the attribute values in the metafile.

The specific language binding function routines of Tables II-V correspond to the procedures invoked by the graphics language binding 24a in response to specific function calls in the graphics application program of Table 1. The function calls selected for the following examples are those in statements 222, 223, and 229. In explaining the language binding embodiment for each statement, it is presumed that the graphics processor 20 has available in storage indexed attribute lists providing an attribute value or characteristc for a particular index value. Thus, there will be respective attribute list entries for line type, line color, graph marker type, graph marker color, graph text font type, graph text color, fill style, fill type, an fill color. It should be evident that since there are no filled characters in the FIG. 3 graph, the last three attribute lists will not be accessed. However, the open workstation statement (220) requires an index value to be established for each attribute. As stated above, the initial values of these attributes and also an aspect ratio attribute are set by statement 205 to initial values. These initial values can be changed through the program, and, in fact the line type, line color, marker type, marker color, text font, and text color values are all changed from their initial setting. It is understood that the VOPNWK call (statement 220) activates an appropriate language binding function routine to enter the default values into the appropriate attribute group setting lists maintained by the graphics processor 20.

TABLE III

| 304 | Function Vslcol (parm1:integer,parm2:integer):integer |
| 305 | Constants |
| 306 | set_line_color = 16#5082 |
| 307 | Variables |
| 308 | device_address:defined parm1 |
| 309 | color_index:defined parm2 |
| 310 | Begin |
| 311 | metafile.command = set_line_color |
| 312 | metafile.values[1] = color_index |
| 313 | Vslcol = CP_graphics_write(device_address,metafile) |
| 314 | Return |
| 315 | End |

Turning now to statement 222 of the graphics application program, Table III provides the set of function routine steps necessary to execute the setting of the line color attribute to an index value of 1 for the output device identified by the DVC data field. The function called is VSLCOL and its input parameters PARM1 and PARM2 are the device address (DVC) and the desired color index setting, respectively. For reference, the VSLCOL functional subroutine is defined in statement 304. In statements 305 and 306, the metafile command for setting line color is declared as a hexadecimal value. The address of the device driver controlling the specified output device and the color index value are defined as the function parameters by statements 307-309. The function routine begins in step 310 by inserting the set line color command and color index value into the metafile command and data fields, respectively. Next, a language binding subroutine for passing the metafile to the graphics processor 20 addressed for output to the graphics device is summoned in step 313. Return is made to the application program in step 314 and the set line color function routine is ended in step 315.

Turning now to the program statement 223, Table IV constitutes a language binding procedure to link the program to the graphics processor 20. As stated above, statement 223 is used by the programmer to draw the x and y axes in the FIG. 3 chart.

TABLE IV

| 330 | Function Vpline(parm1:integer,parm2:integer, parm3:array[1..n,1..2] of integer):integer |
| 331 | Constants |
| 332 | output_polyline = 16#403F |
| 333 | Variables |
| 334 | device_address:defined parm1 |
| 335 | point_count:defined parm2 |
| 336 | coordinates:defined parm3 |
| 337 | Begin |
| 338 | metafile.command = output_polyline |
| 339 | metafile.values[1] = 4*point_count |
| 340 | For i = 1 to point_count |
| 341 | For j = 1 to 2 |
| 342 | metafile.values[(2*(i−1))+j+1] = coordinates[i,j] |
| 343 | End |
| 344 | End |
| 345 | Vpline = CP_graphics_write(device_address,metafile) |
| 346 | Return |
| 347 | End |

Table IV provides a function routine for drawing a polyline (VPLINE) on the addressed device, with the polyline consisting of two segments as defined by three XY coordiinate pairs. The axes parameteer in the VPLINE statement gives the point coordinate data defined in statement 212 of Table I. The function of Table IV is named and defined by statement 330. The constant value defining the polyline drawing command is set in statements 331 and 332. Statements 333-336 define the variables used in the graphics processor subroutine and associate those values with the parameters delivered with the VPLINE statement. The defined metafile structure is filled with a line-drawing command and coordinate values between which the axes are to be drawn by statements 337-343. Statement 345 calls the graphics processor subroutine for passing to the graphics processor 20 the structured metafile containing the command and data for drawing the axes on the addressed device. It should be noted that the line color attribute defining the color in which the axes are to be drawn has been set by the language binding procedure of Table III, corresponding to the function call of statement 222 in Table I.

Table V is representative of a language binding function routine for executing a text drawing function. In this case, the text drawing function is the one in the Table I statement numbered 229. The purpose of statement 229 is to place the graduation value "7,000" at the appropriate position adjacent the y axis of FIG. 3.

TABLE V

| 380 | Function Vgtext(parm1:integer,parm2:array[1..2] of integer,parm3:string):integer |
|---|---|
| 381 | Constants |
| 382 | output_graphic_text = 16#411F |
| 383 | Variables |
| 384 | device_address:defined parm1 |
| 385 | coordinates:defined parm2 |
| 386 | ebcdic_string:defined parm3 |
| 387 | ascii_string:string |
| 388 | Begin |
| 389 | ascii_string = ebcdic_to_ascii (ebcdic_string) |
| 390 | If ((Length(ascii_string) mod 2) > 0 then ascii_string = ascii_string + Chr (0) |
| 391 | metafile.command = output_graphic_text |
| 392 | metafile.values[1] = Length(ascii_string) + 8 |
| 393 | metafile.values[2] = coordinates[1] |
| 394 | metafile.values[3] = coordinates[2] |
| 395 | metafile.values[4] = 0 |
| 396 | metafile.values[5] = Length(ebcdic_string) |
| 397 | For i = 1 to Length(ascii_string) by 2 metafile[i+5] = Val(Substr(ascii_string,i,2)) |
| 398 | End |
| 399 | Vgtext = CP_graphics_write(device_address,metafile) |
| 400 | Return |
| 401 | End |

In Table V, statement 380 links the language binding routine to the VGTEXT function call and accepts as input parameters the device address (PARM1), the x,y coordinates locating the text (PARM2), and the string of EBCDIC characters defining the text (PARM3). It should be noted that the text block to be drawn is also affected by the VSTALN statement (statement 228) which sets the alignment relationship of text characters on the graph. Recall, too, that a text rotation attribute has been set to a default setting in statement 205 of Table I; this establishes the rotational correspondence of text characters with respect to a horizontal baseline on the graph. Steps 381 and 382 establish the text writing command that is understood by the graphics processor 20. Steps 383-386 associate metafile parameters with the parameters PARM1-PARM3. An ASCII variable is defined as a string in statement 387. Conversion of the EBCDIC character string to an ASCII character string is accomplished in steps 390 and 391. The established metafile data structure is filled with command and data values in steps 392-398 with the graphic text production command being placed in the metafile in step 391. The length of the metafiile data is set as the first metafile value. The x and y coordinates are the second and third metafile data values, respectively. The length of the string is given in statement 396 and statements 397-399 place the ASCII representation of the string into the metafile. Statement 399 calls a routine that passes the structured metafile to the graphics processor.

With regard now to the right-hand branch of the procedure of FIG. 4, Tables VI-IX provide representative function routines for the language binding 40a of FIG. 5 that are appropriate to link statements of the graphics application program 52 to the graphics manager 40, exemplified by the GDDM graphics processor described above.

TABLE VI

| 500 | Variables |
|---|---|
| 501 | attributes = structure |
| 502 | next_attribute_pointer:→attributes |
| 503 | device_address:integer |
| 504 | gddm_device_id:integer |
| 505 | line_style:integer |
| 506 | line_color:integer |
| 507 | line_width:integer |
| 508 | text_color:integer |
| 509 | text_height:integer |
| 510 | text_aspect_ratio:real |
| 511 | text_horiz_alignment:integer |
| 512 | text_vert_alignment:integer |
| 513 | sin_text_rotation_angle:real |
| 514 | cos_text_rotation_angle:real |
| 515 | symbol_set_id:integer |
| 516 | color_map:array[1..16] of integer |
| 517 | base_attribute_pointer:→attributes |
| 518 | current_attribute_pointer:→attributes |
| 519 | Constants |
| 520 | line_type_map:array[1..6] of integer |
| 521 | text_cell_scale_factor:real |

In Table VI, the variables making up an attribute structure are declared in statements 501 and 503-516. The attribute structure is rendered in linked-list form by the current, next, and base attribute pointers. The base attribute pointer is the list anchor, the current attribute pointer is the address of the list element currently being inspected, and the next attribute pointer is the address of the next element in the list following the one currently being inspected. Constants are defined in statements 519-521.

Graphics functions in a mainframe graphics processing system, such as the system of FIG. 2 employing a GDDM-type graphics processor, are performed by calling one or mroe GDDM graphics primitive functions. These functions are documented in the IBM GDDM Base Programming Reference for Release for (Publication No. SC32-0101). Since GDDM-type graphics processors do not partition graphics attributes by primitive group classification, but have only the concept of current attributes, the primitive group attributes set in the Table I program must be saved in the linked list described above and established in Table VI. Because the GDDM-type processors support multiple output devices, the variables applicable to a graph produced on a particular output device are kept in a list identified by the address of the device with which it is associated.

Refer now to Table VII, which describes a procedure for implementing the VSLCOL function call of application program as exemplified by statement 222.

TABLE VII

| 530 | Function Vslcol(parm1:integer,parm2:integer):integer |
|---|---|
| 531 | Variables |
| 532 | device_address:defined parm1 |
| 533 | color_index:defined parm2 |
| 534 | Begin |
| 535 | current_attribute_pointer = Locate_attribute list |

TABLE VII-continued

```
                    (device_address)
536       current_attribute_pointer→line_color = color_index
537       Vslcol = 0
538       Return
539     End
```

In Table VII, the VSLCOL function is named and characterized in statement 530. The inputs of the function call are defined as the device address (PARM1) and the color attribute for the VDI-type graphics processor based on graphical primitive partitioning. The procedure consists essentially of a first step of locating the attribute list for the requested device, and a second step of saving the new line color index at the corresponding list element in the located attribute list. In this regard, step 1 is accomplished by statement 535 and step 2 by statement 536. The return code is set in statement 537 and the return to the application program is effected in statements 538 and 539.

The function routine for the line drawing call exemplified by (statement 223) is given in Table VIII.

TABLE VIII

```
550   Function Vpline(parm1:integer,parm2:integer,
                     parm3:array[1..n,1..2] of integer):integer
551     Variables
552       device_address:defined parm1
553       point_count:defined parm2
554       coordinates:defined parm3
555       x-coordinates:array[1..n] of real
556       y-coordinates:array[1..n] of real
557     Begin
558       For i = 1 to point_count
559         x-coordinates[i] = Integer_to_real (coordinates[i,1])
560         y-coordinates[i] = Integer_to_real (coordinates[i,2])
561       End
562       current_attribute_pointer = Locate_attribute list
                                        (device_address)
563       GSLW(current-attribute_pointer→line_width)
564       GSCOL(color_map(current_attribute_pointer→
              line_color))
565       GSLT(line_type_map(current_attribute_pointer→
              line_type))
566       GSMOVE(x-coordinates[1],y-coordinates[1])
567       If point_count = 1 then
568         GSPLNE(point_count,x-coordinates[1],y-coordinates[1])
569       Else
570         GSPLNE(point_count,x-coordinates[2],y-coordinates[2])
571       Vpline = 0
572       Return
573     End
```

For the GDDM graphics processor 40 the line drawing command requires setting line width, line color, line type, and line coordinate attributes. These parameters are either obtained from the attribute list 64 which contains a default value or are set in the parameter field of a function call statement. In this regard, the function call parameters are the device address (PARM1), the line point count (PARM2), and the x, y coordinates of the axes. These parametric associations are all made in statements 551-556. Statements 558-560 convert the integer values of the x, y coordinates in the function call parameter field to real coordinates and reorder them as required by the processor 40. Statement 562 locates the attribute list and statements 563-566 set the current attributes of line width, line color, and line type for the graphics processor 40. In the well-known GDDM system, these attribute function calls are denoted as GSLW, GSCOL, and GSLT, respectively. It is noted that statements 564 and 565 also translate the color index and line style from their VDI to their GDDM representations. Statement 566 sets up the access line-drawing procedure by referencing the procedure to the first set of x, y coordinates. Then, statements 567-570 draw the axes using the converted coordinates. Statement 571 sets the return code for the called function and statements 572 and 573 return program execution to the Table I program.

A representative text-drawing function routine by statement 229 of Table I is supported by the linkage procedure of Table IX.

TABLE IX

```
509   Function Vgtext (parm1:integer, parm2:array[1..2] of
                       integer, parm3:string):integer
591     Constants
592       gddm-vector_mode = 3
593     Variables
594       device_address:defined parm1
595       coordinates:array[1..2] of defined parm2
596       ebcdic_string:defined parm3
597       text_location:array[1..2] of real
598       text_box_x:array[1..4] of real
599       text_box_y:array[1..4] of real
600       text_cell_height,text_cell_width:real
601     Begin
602       For i = 1 to 2
603         text_location[i] = Integer_to_real (coordinates[i])
604       End
605       current_attribute_pointer = Locate-attribute
                list (device_address)
606       GSCM(gddm_vector_mode)
607       GSCS(current_attribute_pointer→symbol_set_id)
608       text_cell_height = text_cell_scale_factor*Integer_
                to_real(current_attribute_pointer→text_height)
609       text_cell_width = text_aspect_ratio*text_cell_height
610       GSCB(text_cell_width,text_cell_height)
611       GSCA(current_attribute_pointer→cos_text_rotation_
                angle, current_attribute_pointer→sin_text_
                rotation_angle)
612       GSQTB(Length(ebcdic_string),ebcdic_string,4,text_
                box_x, text_box_y)
613       text_location{1} = text_location[1]−(Integer_to_real
                (current_attribute_pointer→text_horiz_alignment)
                *((text_box_x[4]−text_box_x[2])/2)) - Integer_
                to_real(current_attribute_pointer→text_vert_
                allignment)*((text_box_x[1]−text_box_x[2]/2))
614       text_location[2] = text_location[2] - (Integer_to_real
                (current_attribute_pointer→text_horiz_allignment)*
                ((text_box_y[4]−text_box_y[21]/2))-(Integer_
                to_real (color_map current_attribute_pointer→text_
                vert_allignment)*)
                ((text_box_y[1]−text_box_y[2]/2))
615       GSCOL(current_attribute_pointer→text_color)
616       GSCHAR(text_location[1],text_location[2],Length
                (ebcdic_string,ebcdic_string)
617       Vgtext = 0
618       Return
619     End
```

The parameters provided to the procedure of Table IX include the device address (PARM1), the coordinates defining the location of the text (PARM2), and the EBCDIC character string defining the text (PARM3). With regard to the coordinates locating the text, it should be noted that as with the example of Table V for the graphics processor 20, text location is also determined by the values for text alignment (VSTALN) and rotation (VSTROT). Reference to Table I will inform that statement 228 will have resulted in a change in setting of text alignment for the case of the y axis graduation labels, while the text rotation parameter will have its default value.

The other variables defined for the text drawing function include: the text location as an array of real numbers, the computed extent of the text on the screen as a two-dimensional array of real numbers, and the text cell height and width as real numbers.

Finally, it should be noted that the GDDM instantiation of the graphics processor 40 includes a multi-mode generator for text drawing. When drawing text, a GDDM graphics processor can draw text characters as images or as vectors. In this case, in order to provide the programmer with the ability to directly scale the size of the text by the well-known boxing or extent technique (see Foley and Van Dam, pp. 375-376), the vector mode of character generation is invoked by setting the vector mode in statement 592.

To support the vector mode of character generation, the point coordinate values in the parameter field of the calling function are converted to real values by statements 602-604. Next, the attribute list for the requested device is obtained by means of statement 605. In statement 606, the vector character drawing mode of the graphics processor is set so that the character size, alignment, and rotation values set in the application program of Table I can be used. Next, the current attribute list is accessed in steps 607 and 608 to select a character font (symbol set) and text height. In step 609, the text cell width is derived by multiplying the text cell height set in statement 608 by a predetermined text aspect ratio. The text cell width and height attributes are set for the processor in statement 610. In statement 611, the current attribute list is accessed to obtain base line rotation values necessary to correctly align the y axis label being drawn. Statements 612-614 perform horizontal and vertical alignment of the label being currently drawn, and statement 615 accesses the current attribute list to set the color of the text being drawn. In statement 616, the graphics processor command which causes the driver to draw the current label at the location and with the attributes previously defined is called. Statement 617 sets the return code and statements 618 and 619 return program control to the application program of Table I.

Although the language binding examples described hereinabove are based upon use of VS FORTRAN as the graphics application programming language, it will be evident to those skilled in the art that language bindings can also be constructed for interfacing graphics application programs written in other languages such as Pascal, and Assembler H. Furthermore, it will be evident that language bindings can be provided for interpreted user languages such as the REXX (restructured extended executor) language available in the IBM software product denoted as VMSP-3 (virtual machine/system product-3). The REXX language can be used for developing applications quickly by using instructions which translate easily to functions or routines expressed in other high-level languages such as FORTRAN.

Finally, although language binding function routines are described only for setting line color, drawing lines, and drawing text, it will be understood by those skilled in the art that other functional routines can be constructed for setting any graphical attribute or executing any graphics drawing function within the capabilities of the graphics processor linked by a language binding to an application program.

Obviously, many other modifications and variations of this invention are possible in light of these teachings. Therefore, it is to be understood that within the scope of the appended claims, the invention may be practiced in forms other than those specifically described.

I claim:

1. A linkage system for providing a set of bindings which enable a graphics application program written in a predetermined program language to be executed in one or the other of two different graphical processor environments independent of the programming language, comprising a graphics output device;

a graphics application process means for providing a series of user language-specific process statements defining a graph;

a graphics process means responsive to graphics commands and graphics attributes for producing device signals corresponding to said graph;

a graphics output device driver connected to said graphics process means and to said graphics output device and responsive to said device signals for producing said graph on said graphics output device;

a graphics language binding means in communication with said graphics application process means in one or the other of said two different graphical processor environments for translating said process statements into said graphics commands and graphics attributes;

a transfer structure means in said graphics language binding means for building a data transfer structure; and a transfer process means in said graphics language binding means for transferring said graphics commands and graphics attributes from said language binding means to said graphics process means in one or the other of said two different graphical processor environments, said graphics attributes being transferred in said data transfer structure.

2. The linkage system of claim 1 wherein said graphics process means in one of said two different graphical processor environments recognizes two or more graphical primitive groups and maintains separate respective sets of graphics attributes, each set of graphics attributes including attributes of a respective graphical primitive group.

3. The linkage system of claim 2 wherein said data transfer structure in one of said two different graphical processor environments is a metafile.

4. The linkage system of claim 2 wherein said transfer process means in one of said two different graphical processor environments includes a message-passing procedure.

5. The linkage system of claim 1 wherein said graphics process means in one of said two different graphical processor environments maintains a current value for one or more graphics attributes and responds through appropriate protocals to a translated graphics command by producing device signals corresponding to a predetermined graphical primitive having graphics attributes determined by said value.

6. The linkage system of claim 5 wherein said graphics process means in one of said two different graphical processor environments includes attribute process means for setting said value and primitive command means for setting device signals corresponding to graphics primitives and said data transfer structure in one of said two different graphical processor environments includes one or more program calls for activating said attribute process means and for activating said primitive command means.

7. The linkage system of claim 6 wherein said transfer Process means in one of said two different graphical processor environments includes a function subroutine having said program calls.

8. A computer programming device for providing portability of a graphics application program written in one programming language between two different graphical processors each having a different graphics interface connected to a peripheral device driver for a peripheral graphics unit such as a printer, plotter, display, including
- first transfer means in communication with a first graphics interface for providing a command and data path to a first graphical processor wherein graphical primitives are partitioned according to basic types and attributes are specified with regard to such basic types;
- second transfer means in communication with a second graphics interface for providing a transformation of signals to a second graphical processor wherein a current set of attributes are defined for the type of graphical primitive currently being drawn and such attributes are maintained until changed; and
- language binding means for receiving function calls and parameter specifications generated by the graphics application program and converting them either into a suitable format for transfer in a data transfer structure via said first transfer means to said first graphics interface or alternatively into a different format and sequence using attribute setting subroutines and primitive command subroutines for transfer via said second transfer means to said second graphics interface, and wherein said first and second graphical processors are independent of any programming language.

9. The computer programming device of claim 8 wherein said one programming language is taken from a group consisting of Fortran, Pascal, Assembler H, Basic C, and REXX.

10. The computer programming device of claim 8 wherein said first graphics interface conforms to an industry standard identified as CGI (Computer Graphics Interface).

11. The computer programming device of claim 8 wherein said second graphics interface conforms to the Graphics Data Display Manager (GDDM) standard.

12. The computer programming device of claim 8 wherein said second graphical processor is incorporated as part of a mainframe-type computer system.

13. The computer programming device of claim 8 wherein said first graphical processor is incorporated as part of a PC-type desktop computer system.

14. The computer programming device of claim 8 wherein other differences between said first graphical processor and said second graphical processor include line drawing coordinate procedures, color specification and listing, and text character specification and designation.

* * * * *